Oct. 9, 1962    H. H. WALKER ETAL    3,057,758
SYSTEM FOR MEASURING AND INCREASING FLOW THROUGH PIPELINES
Filed Oct. 26, 1960
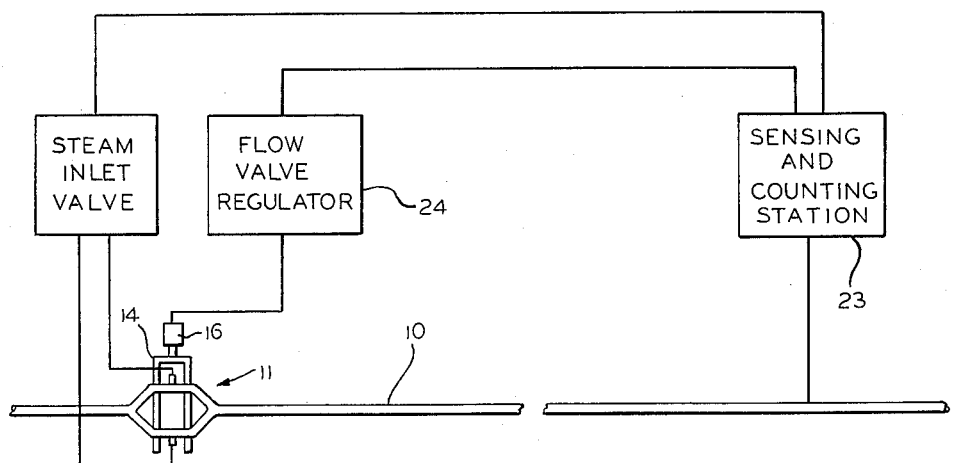
FIG. 1
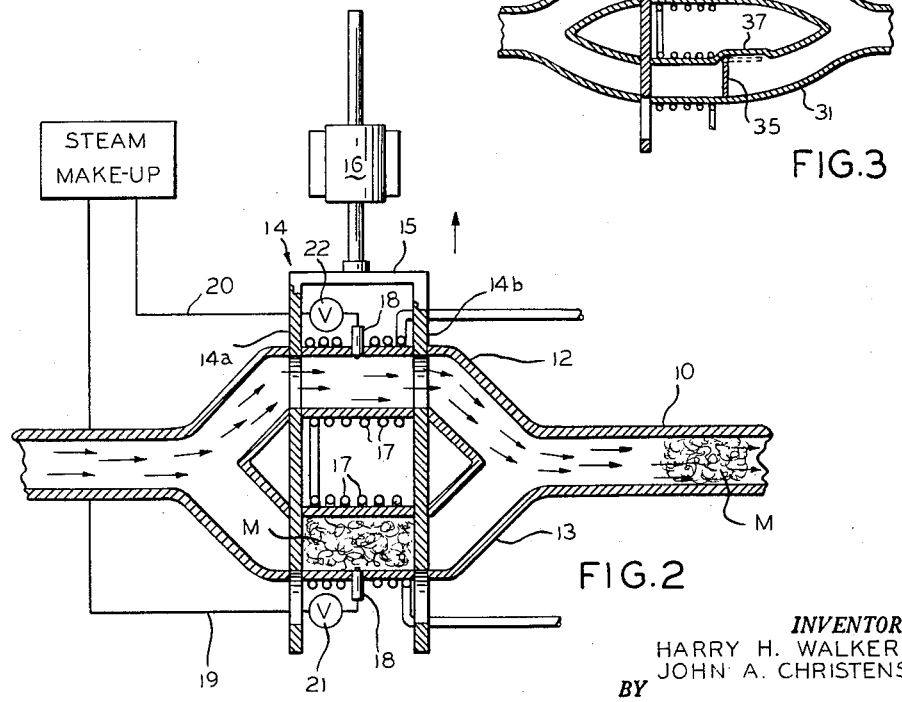
FIG. 3
FIG. 2
INVENTORS
HARRY H. WALKER
JOHN A. CHRISTENSEN
BY
ATTORNEYS United States Patent Office
3,057,758
Patented Oct. 9, 1962

3,057,758
SYSTEM FOR MEASURING AND INCREASING
FLOW THROUGH PIPELINES
Harry H. Walker, P.O. Box 3565, Beirut, Lebanon, and
John A. Christensen, 93 Via Fleming, Rome, Italy
Filed Oct. 26, 1960, Ser. No. 65,203
7 Claims. (Cl. 134—8)

The present invention is directed to a new and improved method and apparatus for both increasing flow through in long petroleum transmission lines, and for accurately measuring the quantity of such flow.

It is highly important in connection with petroleum transmission lines to accurately measure a flow rate. In these transmission systems a very small percentage of error can result in a relatively large waste of petroleum over a small period of time as, for example, several weeks. Inaccuracy in measuring the flow rate either results in delivering a lesser quantity of petroleum to the customer than is contracted for, or in delivering too much. Either condition is unsatisfactory from the standpoint of the buyer or seller, as the case may be. Furthermore, in these transmission lines it is important to periodically clean the inner walls of the pipe so as to insure a maximum flow through the line.

Accordingly, a major purpose of the present invention is the provision of a method and apparatus for periodically manufacturing a plug of solid-like formation within the pipe or transmission line, and releasing this plug for travel through the pipe. As manufactured, the plug is of a size corresponding to the inner diameter of the pipe, and as it travels through the pipe it will tend to scrape and clean the interior wall of the pipe. As manufactured, the plug is of such a nature that it is eventually soluble in the petroleum in transit. It has no deleterious effect on the petroleum in transit.

A counting system is so related to the plug manufacturing system that the passage of plugs and the manufacture thereof is counted, and from the count, a tabulation of the quantity of petroleum flowed may be made easily. The system is so arranged that every time a plug passes a predetermined point in the pipe line, another plug is released at the point of manufacture. Since the volume of the line is known between the point of release of the plugs and the point at which the passage of the plug is counted, this volume may be correlated to flow rate by simply correlating the volume to the period of time which is required for the plug to pass over this distance, and by multiplying this volume by the number of plugs passing the counting station, the total quantity flowed over a period of time may be tabulated easily.

Although the system and apparatus are shown and described herein as primarily directed to a system for tabulating the total quantity of flow through a pipe line, it should be understood that the method and purpose for manufacturing plugs may be utilized for cleaning the pipe lines, without the counting instrumentalities of the system, all as hereinafter described.

Other purposes will appear from time to time in the course of the ensuing specification and claims and by reference to the drawings, in which:

FIGURE 1 is a diagrammatic view of a system embodying the present invention; and FIGURE 2 is a diagrammatic view of a system for manufacturing plugs for release in the system of FIGURE 1; and FIGURE 3 is a sectional view of a modification.

Like elements are designated by like characters throughout the specification and drawings.

With specific reference now to the drawings and in the first instance to FIGURE 1, the numeral 10 designates an elongated pipeline utilized to convey liquid petroleum by line 10, which, in accordance with conventional practice, may be positioned underground. Liquid petroleum is forced through line 10 by pumping instrumentalities (not shown). At a predetermined point in the length of the transmission line, a plug manufacturing assembly is installed as at 11. The plug manufacturing assembly is illustrated in greater detail in FIGURE 2.

The assembly illustrated in FIGURE 2 includes pipeline conduit portions 12 and 13, each of which has a flow capacity equal to the flow capacity of the main line 10. The portions 12 and 13 operate to bypass one another through the action of a valve mechanism, generally designated at 14, which valve mechanism in one position is adapted to open the portion 12 for the flow of petroleum therethrough while closing the other portion 13 and thereby trapping a portion of the petroleum in transit in the portion 13. Conversely, in the other position of the valve mechanism 14, the portion 13 is open so that petroleum in transit in line 10 may pass therethrough while the portion 12 is closed, thereby trapping a portion of the petroleum in transit therein.

The valve mechanism may take any one of several well-known forms. As diagrammatically illustrated in the drawings, the valve mechanism includes spaced gate members 14a and 14b which are interconnected by means of a connecting piece 15. The connecting piece is coupled to a motor drive as illustrated at 16 so that gates 14a and 14b may be reciprocated upwardly and downwardly, as appears in FIGURE 2 of the drawings. Gates 14a and 14b each have plural apertures therein, which apertures have a size correponding to the internal diameter of the pipeline. These apertures are so positioned that when the valve is in the lower position as appears in FIGURE 2, the bypass portion 12 is open so that petroleum may flow through this bypass portion at the same time the other portions of gates 14a and 14b close off the passage portion 13, thus trapping petroleum therein. Movement of the valve mechanism to the other side (upwardly in FIGURE 2) exposes the other apertures to the conduit 13 so that petroleum may flow through these apertures and conduit portion 13.

Each of the conduit portions 12 and 13 forms a refrigerating chamber as by means of the refrigerating coils 17 wrapped around each of these conduit portions. Any refrigerant cycling assembly of well known form may be used to cycle refrigerant through the coils 17, so as to enable the lowering of temperatures in portions 12 and 13 to a point below freezing. Each conduit includes a nozzle 18 mounted in the wall thereof, which nozzles 18 are adapted to direct steam into the conduit portions 12 and 13. Suitable lines 19 and 20 may lead from a steam makeup desirable to the nozzles 18. Valve members 21 and 22 are adapted to selectively open the steam line to the nozzles so as to interject steam into the conduit operations 12 and 13.

A relatively small quantity of steam is periodically admitted through the nozzles to the chambers defined by the conduit portions 12 and 13 to provide a mass of solid-like formation. For example, if the chambers and the transmission line 10 have a diameter of several feet, a quantity of steam which amounts to approximately a pound of condensed water vapor will be sufficient to form a plug of solid-like formation as described herein. Injection of the steam results in a large number of condensed water vapor particles to be dispersed throughout the liquid petroleum held in the portions 12 or 13.

The petroleum is held in one or the other of the chambers after interjection of steam therein for a period of time sufficient to condense the water vapor and reduce the temperature of the water vapor below freezing at which point the dispersed particles of water, condensed from the steam, freeze and cause a coagulation of the entire mass of petroleum in the chambers, which mass is of solid-like formation, having a jelly-like or curd-like consistency.

By actuation of the gate valve, this mass M is then released for travel through the main line 10 and since it has a cross-sectional area generally equal to the cross-sectional area of the transmission line 10, it will scrape the inner walls of the transmission line 10 and tend to remove material deposited on these walls from the flow of the petroleum therethrough.

The gate members 14a and 14b may be spaced so as to define chambers slightly longer than the pipe diameters as shown in the drawings, or may be spaced apart a distance corresponding to the pipe diameter.

A counting station 23 is located downstream from the chambers 12 and 13 and at a point a selected distance from the chambers 12 and 13. It may, for example, be positioned a mile downstream. Counting station 23 includes an instrument for sensing the passage of the plug released from the chambers 12 and 13. Sensing station 23 may, for example, include a trip finger extending into the transmission line, which finger is moved upon contact therewith by the plug released from the chambers 17 and 13. Movement of the finger may be utilized to actuate a switch to in turn cause actuation of a counter and cause actuation of the gate mechanism 14 and the steam valves.

Other sensing instrumentalities, such as instruments which may sense the passage of water or instruments that will sense the passage of the solid-like plug may be utilized in place of the mechanical counting finger.

The sensing mechanism is connected electrically to the valve actuating mechanism through suitable motor controls diagrammatically represented at 24. When the sensing mechanism is actuated by the passage of a plug, the motor 16 is operated to slide the gate valve to the opposite position, thereby releasing a plug from the closed one of the conduits 12 and 13, and allowing flow of petroleum therethrough. At this same time, the other conduit is closed by the valve so that a volume of petroleum is trapped therein. The electrical mechanism also causes opening of the steam inlet valve for the closed chamber to interject a small quantity of steam into this closed chamber. The freezing action of the coils 17 then reduces the temperature of the petroleum and particles of water vapor in these conduits below freezing, causing freezing of the particles and coagulation of the petroleum mass so that another plug is formed and ready for release into the main transmission line.

Since the volume of the line between the conduits 12 and counting station 23 is known, the counter, by counting the number of plugs passing the counting station, will reflect the actual quantity of petroleum flowed over a period of time.

The plugs, after passing the counting station, will disperse, due to the gradual rise in temperature of the plug as it passes along with the main stream of petroleum. The quantity of water injected is of a minute order with respect to the overall volume in transit and will have no adverse effect of any consequence on the petroleum in transit.

Plug manufacturing facilities of the type illustrated herein may be installed at intervals along a large pipeline so that plugs may be manufactured and released for cleaning purposes alone. The branch conduits, gate valves, and refrigerating tubing may be installed at intervals generally corresponding to the length of pipe sections required for the solid-like plugs to break up and disperse.

Different forms of valve mechanisms or gates for closing off the conduits may be utilized with the system. FIGURE 3, for example, represents one variant form of the system. In FIGURE 3 refrigerated branch conduit portions 30 and 31 are adapted to be connected in a pipe line in a manner similar to the systems of FIGURES 1 and 2. In FIGURE 3, however, a single slide valve 32 is positioned across the inlet side of the portions and adapted to close one portion while opening the other and vice versa. The valve member is reciprocated by an actuating rod 33, which may be operated by the motor mechanism illustrated in FIGURES 1 and 2. In FIGURE 3, however, pivotal valves 34 and 35 are adapted to extend across the discharge sides of the conduit portions 30 and 31. These valve members 34 and 35 are adapted to swing downwardly within their respective portions and close these portions through the action of gravity. These valve members 34 and 35 are sufficiently light in weight so that they will move upwardly to the dotted line positions illustrated in FIGURE 3 under the forces produced by normal flow through their respective conduit portions. The conduit portions 30 and 31 may include offset portions 36 and 37 which accommodate these valve members so as to enable a flow cross section of the same dimensions as the remainder of the conduit portions.

It should be noted also that the slope of the conduit portions 30 and 31 is much less than the slope of the conduit portions 12 and 13 in FIGURE 2. In this regard it should be understood that in some cases it may be preferable to minimize the abruptness of changes in flow direction through the conduit portions. In these cases, of course, the conduit portions may be made sufficiently long to enable quite gradual changes in direction.

In FIGURE 3 the operation is similar to the system of FIGURES 1 and 2, the gate members 34 and 35 moving upwardly to their opened positions in response to flow through the conduit portions or movement of the plug out of the refrigerated chambers defined by the valves 32, 34 and 35.

Other forms of valves are, of course, possible with the system. For example, in lieu of the slide valve 32, swinging gate valves may be used to open and close conduit portions 30 and 31.

In lieu of fully automatic operation, the system can be so arranged that an attendant, upon noting actuation of the counter 23, or visually observing the passage of the plug and personally counting the number of plugs passing, closes a switch which will energize the gate valve to shift into the opposite position, open valve 21 or 22 and interject steam into the closed conduit portion 12 or 13, as the case may be.

The user of the system, if desiring to utilize only the plug manufacturing instrumentalities, may, of course, manually actuate the valves to open and close the chambers of portions 12 and 13, and also manually actuate valves to selectively admit a small quantity of steam to the coagulating chambers.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. For example, other forms of valve mechanisms well known to those skilled in the art, may be used to open and close the chambers. The scope of the invention should be limited only by the scope of the hereinafter appended claims.

We claim:

1. A method of cleaning a pipeline with soluble plugs of a size corresponding to the internal diameter of a pipeline, including the steps of bypassing a portion of the petroleum passing through a pipeline through a line having an internal diameter corresponding to the diameter of the pipeline, holding the petroleum bypassed out of the main pipeline for a preselected interval of time, injecting steam into the petroleum bypassed, subjecting the mixed petroleum and water vapor condensed from the steam to temperatures below freezing and for a period of time sufficient to coagulate the petroleum and water vapor into a plug of solid-like formation and of a size corresponding to the cross-sectional area of the pipeline, and thereafter releasing said plug for flow from said bypass through the main portion of said pipeline.

2. A method for manufacturing a cleaning plug for liquid petroleum pipelines including the steps of holding a body of liquid petroleum in transit through a pipeline at a relatively fixed position in the line, reducing the temperature of said body and injecting a small quantity of steam into said body, maintaining said body at said position until the temperature thereof is reduced to a point below freezing and the water vapor condensed from the steam has caused coagulation of the body from the liquid state to a solid plug of curd-like consistency, and thereafter releasing the plug for travel through the pipeline.

3. The method of claim 2 wherein petroleum in the pipeline is bypassed around said position while said body is held in said position.

4. The method of claim 2 characterized by and including the steps of counting the number of plugs passing a predetermined length of pipeline, and manufacturing and releasing a new plug each time a plug passes through said length.

5. An apparatus for cleaning pipeline walls including a pipeline section formed and adapted to be communicable with transmission line for liquid petroleum, said section having an inlet and an outlet for the flow of petroleum therethrough, said section having a pair of conduit portions each having a size corresponding to the size of said inlet and outlet, each portion being in communication with said inlet and outlet, movable valve means for opening one portion to the inlet and the outlet and for closing the other portion to the inlet and outlet to allow flow through one portion while the other portion is closed, each of said portions having refrigerating means operatively associated therewith so as to reduce the temperature therein to a point below freezing, and means for injecting water vapor into each of said portions to thereby form a coagulated mass within said closed portion.

6. The structure of claim 5 wherein said means for injecting water vapor includes a source of steam, a steam inlet nozzle for each conduit portion and means for selectively controlling the flow of steam through each nozzle.

7. An apparatus for measuring pipeline flow including a pipeline section formed and adapted to be communicable with transmission line for liquid petroleum, said section having an inlet and an outlet for the flow of petroleum therethrough, said section having a pair of conduit portions each having a size corresponding to the size of said inlet and outlet, each portion being in communication with said inlet and outlet, movable valve means for opening one portion to the inlet and the outlet and for closing the other portion to the inlet and outlet to allow flow through one portion while the other portion is closed, each of said portions having refrigerating means operatively associated therewith so as to reduce the temperature therein to a point below freezing, and means for injecting water vapor into each of said portions to thereby form a coagulated mass within said closed portion, sensing and counting means adapted to sense and count the passage of coagulated masses through a predetermined length of pipeline, and actuating means responsive to said sensing means, said water vapor injection means and said valve means being operated by said actuating means to shift said valve means to open one conduit portion for the release of the coagulated mass therein, while closing the other conduit portion and causing injection of water vapor into the closed portion in response to the passage of a mass thtrough said predetermined length.

References Cited in the file of this patent

UNITED STATES PATENTS

| | | |
|---|---|---|
| 973,794 | Lithtcap | Oct. 5, 1910 |
| 2,411,044 | Landrum | Nov. 12, 1946 |
| 2,656,508 | Coulter | Oct. 20, 1953 |
| 2,876,842 | McSpadden | Mar. 10, 1959 |
| 2,915,422 | Stone | Dec. 1, 1959 |